March 11, 1941. W. W. SMITH 2,234,782
FABRICATED METAL STRUCTURE
Filed March 22, 1939 2 Sheets-Sheet 1
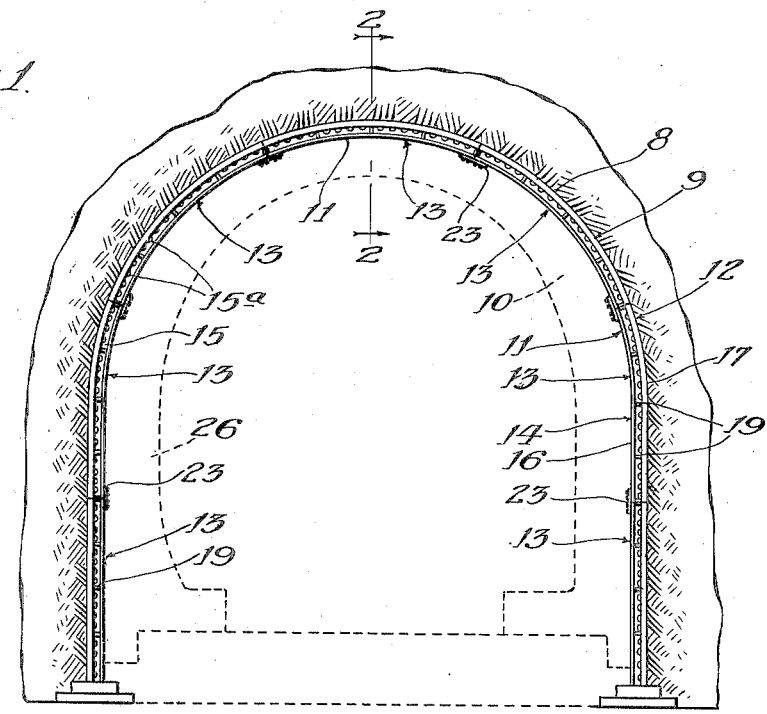
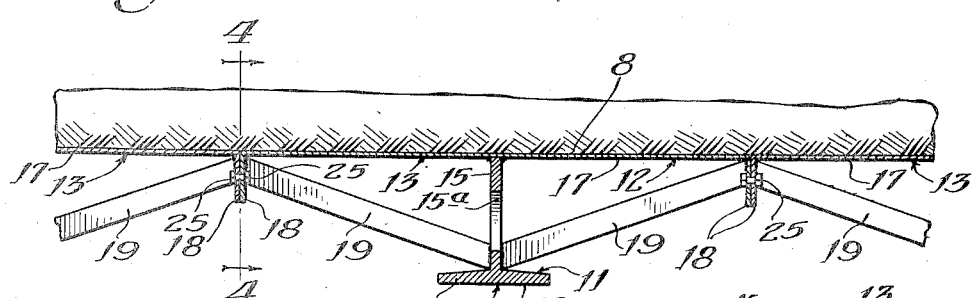
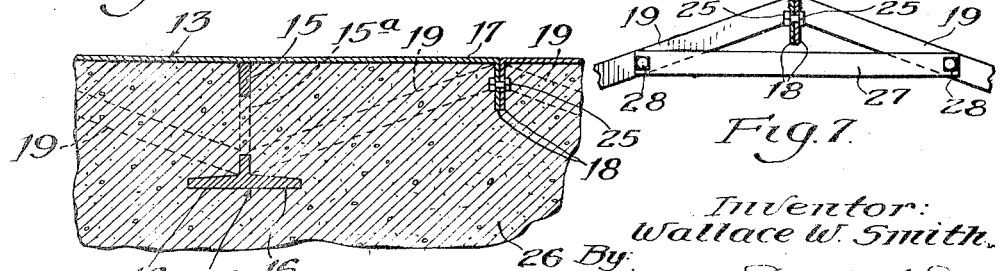
Inventor:
Wallace W. Smith March 11, 1941.　　　　W. W. SMITH　　　　2,234,782
FABRICATED METAL STRUCTURE
Filed March 22, 1939　　　2 Sheets-Sheet 2

Inventor:
Wallace W. Smith,
By: Chritton, Wiles, Davies, Hirschl & Dawson
Attorneys Patented Mar. 11, 1941

2,234,782

UNITED STATES PATENT OFFICE 2,234,782

FABRICATED METAL STRUCTURE

Wallace W. Smith, Chicago, Ill., assignor to Inland Steel Company, Chicago, Ill., a corporation of Delaware Application March 22, 1939, Serial No. 263,516

3 Claims. (Cl. 61—45)

My invention relates to fabricated metal wall structures such as, for example, and more particularly, retaining wall structures for use in connection with the production of underground tunnels, particularly of the type involving an inner wall structure of concrete extending over the metal retaining wall.

My primary object, generally stated, is to provide improvements in wall structures to the end that the cost of producing such a structure, particularly when provided as a retaining wall for a tunnel and more especially wherein an inner concrete wall is provided, will be reduced and certain operations heretofore required, may be omitted, thereby not only reducing the cost of construction but also expediting the installation of the wall structure.

Other objects of the invention will be apparent from the following description.

Referring to the accompanying drawings:

Figure 1 is a cross sectional view of a reinforced concrete underground tunnel undergoing construction and embodying my invention.

Figure 2 is an enlarged fragmentary sectional view taken at the line 2—2 on Fig. 1 and viewed in the direction of the arrows, this view showing the structure before the concrete is cast.

Figure 3 is a similar view showing the concrete cast against the retaining wall structure.

Figure 4 is a fragmentary view taken at the line 4—4 on Fig. 2 and viewed in the direction of the arrows, this view showing a part of the curved upper portion of the retaining wall.

Figure 5 is a view like Fig. 4 but taken at one of the upstanding side walls of the retaining wall structure.

Figure 6 is an inner face view of one of the similar structural metal elements forming the retaining wall, an adjacent one of these elements being shown in dotted lines to illustrate the relationship of adjacent ones of these elements in the structure; and Figure 7, a fragmentary view like Fig. 2 illustrating a modification of the structure shown therein.

Referring to the illustrated embodiment of the invention, the practice, in forming underground tunnels is to install, as the tunneling work proceeds, an arched retaining wall affording arch ribs spaced apart in a direction lengthwise of the tunnel and plate portions extending outwardly from the rib portions and forming a lining for the bore, the structure thus provided forming a retaining wall which, under usual conditions, is subjected, by the surrounding earth, to inwardly directed forces of great magnitude, which must be resisted to prevent undue distortion or collapse of such wall.

These structures also comprise, as commonly provided, a wall of concrete applied to the inner surface of the retaining wall structure and generally conforming in shape thereto.

The practice heretofore followed consists in providing the rib portions of the arches as elements separate from the plates and the setting of the ribs and plates into position by separate operations.

My invention involves, as distinguished from the usual practice above set forth, the provision of the rib portions and the plate portions as fabricated structural units whereby the rib portions and the plates are assembled to form the retaining wall as unitary structures thereby reducing the number of operations required in assembling the wall forming elements within the tunnel structure.

I have illustrated my invention in connection with a tunnel structure of the general character above referred to, the drawings showing at 8 the arched bore 8 tunneled out of the earth, the inner surface of which is to be walled, the retaining wall structure for the bore 8 being represented at 9 and the inner concrete wall at 10; the retaining wall structure 9 comprising arched ribs 11 spaced apart in a direction lengthwise of the tunnel and arched continuous plate-like wall portions 12 located outwardly beyond the rib portions 11 and against which the earth at the bore 8, bears.

In the construction shown the retaining wall is provided in sections presenting a series thereof extending lengthwise of the tunnel and also a series extending crosswise of the tunnel, those of the sections which are at the upper portion of the wall being of suitable curved form and those at the vertical sides of the tunnel, of straight form. Each of the sections referred to (and represented at 13), however, are of the same construction.

Each section 13 comprises a structural metal T-bar 14 the web of which is shown at 15 and its flange, which extends at substantially the same distance beyond the web 15 at opposite sides thereof, at 16, the web 15 having openings 15a spaced apart, the series of these openings extending substantially throughout the length of the bar 14. Each section also comprises a plate-like portion 17 shown as formed separate from the T-bar 14 and secured flatwise to the outer edge of the web 15 as by welding it thereto. The plate 17 is shown as of general rectangular shape and extends lengthwise of the T-bar 14 which latter is located midway between the opposite longitudinal edges of the plate, these opposite edges being provided with flanges 18 located at the side of the plate at which the T-bar is located, and extending the full length of these edges.

Spaced apart along each section 13 are diagonal braces 19 which extend into the interior angles between the web 15 and the flange 16 and between the body of the plate 17 and its flanges 18 and are rigidly secured thereto as for example by welding.

One end of each section 13, except the middle curved section, is provided with a splice bar 20 extending crosswise thereof and welded to the outer surface of the plate 17, this bar having openings 21 therein; the other end of the plate having openings 22 spaced apart as in the case of the splice bar 20. The middle curved ones of the sections 13 have similar splice plates 20 welded to their opposite ends (Fig. 4). In the assembling of adjacent sections 13 to form the arch the openings in the splice bars 20 register with the openings 22 of the adjacent plate and bolts or rivets 20a placed in these registering openings connect the plates together.

In the constructing of the wall each arch section thereof is formed by assembling in the bore 8, a plurality of curved and straight sections 13 to form an arch, the plates 17 of adjacent sections 13 being connected together in end to end relation by means of the splice bars 20 as shown, and the rib portions 14 endwise connected together by plates 23 bolted at 24 to the flanges 16.

Each arch section thus formed is connected, in its position in the bore 8, with the adjacent arch section, as by bolting or riveting together the mutually flatwise opposed flanges 18 on the plate 17, as indicated at 25, thereby forming a continuous arch plate wall opposing the earth against which it is positioned, with continuous spaced apart rib arches extending about the inner surface of this plate-like wall.

As the erection of the metal wall continues, the concrete to form the main portion of the wall represented at 26 is cast about the inner surface of the metal wall as shown in Figs. 1 and 3, embedding therein the ribs 14, flanges 18, and braces 19, the concrete extending continuously from one side to the other of the webs 15 through the openings 15a.

The plate portions 17, as will be understood, are caused to function as flanges of a beam comprising the web 15 and flange 16 and thus in designing the wall structure may be considered as aiding in the resisting of stresses, thus serving the two-fold function of forming a plate-like wall about the bore and also aiding the rib portions in taking the stresses which they are required to resist, thereby saving in the amount of metal required.

Furthermore, by providing the rib portions 14, particularly when the concrete extends through openings in the webs 15 as stated, the flanges 16 may be properly figured as reinforcement for the concrete, thereby reducing the amount of additional metal, as for example in the form of rods (not shown) required to be embedded in the concrete for reinforcement purposes in accordance with common practice.

Another advantage of the construction is that the structure is devoid of any parts extending outwardly into the earth, from the plates, and thus the problem of grouting between the wall and the earth to avoid settling, is avoided.

The following example of the dimensions of the several elements of the structure when made of steel are presented, but by way of illustration only, of an installation in which the several parts may function as above stated.

In accordance with this example the plates 17 are of 11 gage and about 7 feet long and 24 inches wide, the flanges 18 being 2 inches deep. The webs 15 of the T-bars 14 are about 6 inches deep and about 1/4 of an inch thick and the flanges 16 about 5 inches wide and about 3/8 inch thick at their outer edges; the brace bars 19 being about 1 inch deep and about 5/16 inch in width. The holes 15a are 2 1/2 inches in diameter with a spacing between them from center to center of about 5 inches.

If desired, adjacent ones of the sections 13 may be braced, as for example by brace bars 27 (Fig. 7), bolted, as represented at 28, to the adjacent braces 19 of these sections to span the flange-joint therebetween.

While I have illustrated and described a particular construction embodying my invention and also a modification thereof, I do not wish to be understood as intending to limit my invention thereto as the structures shown may be variously modified and altered and the invention embodied in other forms of structure without departing from the spirit of the invention.

What I claim as new and desire to secure by Letters Patent is:

1. A structural metal tunnel-wall element comprising a rib portion having a flange and web, a plate portion connected between its opposite edges to said rib portion in spaced relation to said flange, said plate portion being of much greater width than said flange and extending at edge portions thereof beyond opposite lateral edges of said flange, and braces extending from said rib portion to said plate portion adjacent the outer edges of said plate portion.

2. A structural metal tunnel-wall element comprising a rib portion having a flange and web, a plate portion connected between its opposite edges to said rib portion in spaced relation to said flange, said plate portion being of much greater width than said flange and extending at edge portions thereof beyond opposite lateral edges of said flange, said edge portions of said plate portion having flanges extending generally lengthwise of said rib portion, and braces extending from the interior angles of said rib portion to the interior angles at the flanges on said plate portion.

3. A tunnel wall structure comprising a series of wall forming elements disposed side by side, each comprising a rib portion having a flange and web, a plate portion connected between its opposite edges to said rib portion in spaced relation to said flange, said plate portion being of much greater width than said flange and extending at edge portions thereof beyond opposite lateral edges of said flange and braces extending from said rib portion to said plate portion adjacent said edge portions thereof, means connecting together adjacent edges of said plate portions and brace members extending between said braces of adjacent ones of said elements.

WALLACE W. SMITH.